(12) United States Patent
Maruichi et al.

(10) Patent No.: US 10,081,166 B2
(45) Date of Patent: Sep. 25, 2018

(54) HEAT-SHRINKABLE FILM

(71) Applicant: GUNZE LIMITED, Ayabe-shi, Kyoto (JP)

(72) Inventors: Naoyuki Maruichi, Shiga (JP); Yuki Ohama, Shiga (JP)

(73) Assignee: GUNZE LIMITED, Kyoto (JP)

( * ) Notice: Subject to any disclaimer, the term of this patent is extended or adjusted under 35 U.S.C. 154(b) by 0 days.

(21) Appl. No.: 14/438,475

(22) PCT Filed: Nov. 8, 2013

(86) PCT No.: PCT/JP2013/080260
§ 371 (c)(1),
(2) Date: Apr. 24, 2015

(87) PCT Pub. No.: WO2014/080777
PCT Pub. Date: May 30, 2014

(65) Prior Publication Data
US 2015/0273803 A1  Oct. 1, 2015

(30) Foreign Application Priority Data
Nov. 22, 2012  (JP) ................................ 2012-256646

(51) Int. Cl.
*B32B 27/08* (2006.01)
*B32B 27/32* (2006.01)
*B32B 25/08* (2006.01)
*B32B 25/14* (2006.01)
*B32B 27/18* (2006.01)
*B32B 27/20* (2006.01)

(52) U.S. Cl.
CPC .............. *B32B 27/08* (2013.01); *B32B 25/08* (2013.01); *B32B 25/14* (2013.01); *B32B 27/18* (2013.01); *B32B 27/20* (2013.01); *B32B 27/32* (2013.01); *B32B 27/325* (2013.01); *B32B 2250/24* (2013.01); *B32B 2264/02* (2013.01); *B32B 2264/025* (2013.01); *B32B 2264/0235* (2013.01); *B32B 2264/0292* (2013.01); *B32B 2307/306* (2013.01); *B32B 2307/412* (2013.01); *B32B 2307/514* (2013.01); *B32B 2307/558* (2013.01); *B32B 2307/582* (2013.01); *B32B 2307/736* (2013.01); *B32B 2307/75* (2013.01); *B32B 2519/00* (2013.01); *B32B 2553/00* (2013.01); *Y10T 428/31909* (2015.04); *Y10T 428/31913* (2015.04)

(58) Field of Classification Search
None
See application file for complete search history.

(56) References Cited

U.S. PATENT DOCUMENTS

| 2004/0053064 A1* | 3/2004 | Masuda ................ B29C 55/143 428/500 |
| 2004/0072002 A1* | 4/2004 | Hashioka ................ B32B 27/32 428/515 |
| 2004/0115453 A1* | 6/2004 | McAllister, Jr. .... B29C 47/0026 428/484.1 |
| 2008/0050651 A1* | 2/2008 | Wakai ................... B29C 61/003 429/185 |
| 2009/0130351 A1 | 5/2009 | Hoshi et al. |
| 2009/0135483 A1 | 5/2009 | Asano et al. |
| 2009/0291284 A1* | 11/2009 | Frauenhofer ........... B32B 27/32 428/220 |
| 2011/0065867 A1* | 3/2011 | Keung ....................... C08J 5/18 525/240 |
| 2011/0212277 A1 | 9/2011 | Masuda et al. |
| 2011/0212338 A1* | 9/2011 | Ambroise ............... C08L 23/06 428/516 |
| 2011/0268979 A1* | 11/2011 | Ambroise ............... C08L 23/04 428/516 |
| 2011/0288266 A1 | 11/2011 | Kato |
| 2013/0095338 A1* | 4/2013 | Lu ............................. B32B 7/12 428/519 |

FOREIGN PATENT DOCUMENTS

| CN | 1399661 | 2/2003 |
| CN | 1488492 | 4/2004 |
| CN | 101389987 | 3/2009 |
| CN | 101909887 | 12/2010 |
| CN | 102171039 | 8/2011 |
| CN | 102262316 | 11/2011 |
| EP | 1270664 | 1/2003 |
| EP | 1 388 559 | 2/2004 |
| EP | 1632343 | * 3/2006 |
| JP | 2004-181876 | 7/2004 |
| JP | 2005-138386 | 6/2005 |
| JP | 2006-027052 | 2/2006 |
| JP | 2006-337933 | 12/2006 |
| TW | 200722462 | 6/2007 |
| TW | 200909212 | 3/2009 |
| TW | 201035166 | 10/2010 |
| WO | 2008/143230 | 11/2008 |

* cited by examiner

*Primary Examiner* — Ronak C Patel

(74) *Attorney, Agent, or Firm* — Hamre, Schumann, Mueller & Larson, P.C.

(57) ABSTRACT

The present invention provides a heat shrinkable film that has excellent heat shrinkability while preventing contamination in subsequent processes such as printing. The present invention relates to a heat shrinkable film that at least includes a front layer and/or a back layer. The front layer and the back layer each contain a cyclic olefin resin in an amount of 55 to 99.99% by weight and organic fine particles in an amount of 0.01 to 0.3% by weight.

3 Claims, No Drawings

HEAT-SHRINKABLE FILM

TECHNICAL FIELD

The present invention relates to a heat shrinkable film that has excellent heat shrinkability while preventing contamination in subsequent processes such as printing.

BACKGROUND ART

Many of plastic bottles, metal cans, and the like containers have heat shrinkable labels thereon these days. Such heat shrinkable labels are produced by printing images on heat shrinkable films made of thermoplastic resin.

Heat shrinkable films are required to have various properties such as heat resistance, solvent resistance, and tearing properties along the perforation as well as low temperature shrinkability.

Such a heat shrinkable film contacts a metal control roll in subsequent processes such as printing or label processing, whereby the surface of the film is shaved off. The shavings of the film unfortunately foul the metal control roll.

In view of this, Patent Literature 1 discloses a method for improving antiwear properties of the film during film travelling by specifying the surface roughness of the film.

CITATION LIST

Patent Literature

Patent Literature 1: JP 2005-138386 A

SUMMARY OF INVENTION

Technical Problem

The present inventors have made further studies and have found out that some conventional heat shrinkable films have another disadvantage, namely that they shave off the surface of the metal control roll in subsequent processes such as printing and label processing, and the metal dusts thus formed contaminate the metal control roll or the film.

An object of the present invention is to provide a heat shrinkable film that has excellent heat shrinkability while preventing contamination in subsequent processes such as printing.

Solution to Problem

One aspect of the present invention provides a heat shrinkable film that at least includes a front layer and/or a back layer. The front layer and the back layer each contain a cyclic olefin resin in an amount of 55 to 99.99% by weight and organic fine particles in an amount of 0.01 to 0.3% by weight.

The present invention is described in detail below.

The present inventors have found out that a heat shrinkable film that includes a front layer and/or a back layer, the front layer and the back layer each containing a cyclic olefin resin and organic fine particles in predetermined proportions, can have excellent heat shrinkability while preventing contamination in subsequent processes such as printing. The inventors thus completed the present invention.

The heat shrinkable film of the present invention at least includes a front layer and/or a back layer. The front layer and the back layer each contain a cyclic olefin resin in an amount of 55 to 99.99% by weight and organic fine particles in an amount of 0.01 to 0.3% by weight.

Herein, the term "front layer and back layer" means both of the front layer and the back layer. If the heat shrinkable film of the present invention has a single layer structure, the "front layer or back layer" means the heat shrinkable film itself.

The front layer and the back layer each contain a cyclic olefin resin.

Incorporation of the cyclic olefin resin into the front layer and the back layer can lower the crystallinity, increase the heat shrinkage, and improve the stretchability in film formation.

Examples of the cyclic olefin resin include (a) copolymers of ethylene or propylene with cyclic olefins (e.g., norbornene and derivatives thereof, tetracyclododecen and derivatives thereof), (b) ring-opening polymers of the cyclic olefins or copolymers of the cyclic olefins with α-olefins, (c) hydrogenated products of the polymers (b), and (d) graft-modified products of the polymers (a) to (c) obtained by grafting unsaturated carboxylic acids or derivatives thereof onto the polymers (a) to (c).

Commercially available examples of the cyclic olefin resin include ZEONOR (from Zeon Corp.), APEL (from Mitsui Chemicals, Inc.), and TOPAS (from Polyplastics Co., Ltd.).

The cyclic olefin is not limited to particular cyclic olefins. Specific examples thereof include norbornene, 6-methylnorbornene, 6-ethylnorbornene, 5-propylnorbornene, 6-n-butylnorbornene, 1-methylnorbornene, 7-methylnorbornene, 5,6-dimethylnorbornene, 5-phenylnorbornene,and 5-benzylnorbornene.

Examples of the tetracyclododecen and the derivatives thereof include 8-methyltetracyclo-3-dodecen, 8-ethyltetracyclo-3-dodecen, and 5,10-dimethyltetracyclo-3-dodecen.

The cyclic olefin resin preferably has a number average molecular weight determined by GPC (gel permeation chromatography) of 1,000 to 1,000,000. If the number average molecular weight is within this range, the film can be easily formed.

The cyclic olefin resin preferably has a specific gravity of 1.00 to 1.06.

The cyclic olefin resin preferably has a glass transition temperature of 20° C. to 130° C., and more preferably 50° C. to 100° C. If the glass transition temperature is lower than 20° C., the heat resistance of the film surface tends to be lower, which leads to easy blocking of containers on an attachment line. Additionally, natural shrinkage tends to be too large. If the glass transition temperature is higher than 130° C., heat shrinkage in the transverse direction tends to be too small.

The amount of the cyclic olefin resin in each of the front layer and the back layer is not less than 55% by weight but not more than 99.99% by weight. If the amount is out of the range, the heat shrinkable film has reduced handleability or reduced transparency.

The amount of the cyclic olefin resin is preferably not less than 70% by weight and more preferably not less than 99.8% by weight, whereas preferably not more than 99.97% by weight.

The front layer and the back layer each preferably further contain an ethylene resin, if necessary.

The cyclic olefin resin in the front layer and the back layer is sensitive to fatty acid esters such as sebum. If a person touches the film with his hand before the film is attached to a container or the like and shrunk, the part of the film where he has left his fingerprints may whiten after the film is shrunk. In order to solve this problem, an ethylene resin may be further added to the front layer and the back layer. Addition of an ethylene resin can give excellent grease resistance to the film.

Examples of the ethylene resin include branched low density polyethylenes, linear low density polyethylenes, ethylene-vinyl acetate copolymers, ionomer resins, and mixtures thereof. Among these resins, branched low density polyethylenes and linear low density polyethylenes are preferred.

Preferred among the branched low density polyethylenes are those that have a density of 0.90 to 0.94 g/cm$^3$ and a MFR of 0.1 to 30 g/10 min. Such branched low density polyethylenes can have good compatibility with the cyclic olefin resin, and can minimize decrease in the transparency.

The "linear low density polyethylenes" herein refer to copolymers of ethylene and α-olefins. Examples of the α-olefins include 1-butene, 1-pentene, 1-hexene, 4-methyl-1-pentene, and 1-octene.

Preferred among the linear low density polyethylenes are those that have a density of 0.88 to 0.94 g/cm$^3$ and a MFR of 0.1 to 30 g/10 min.

The amount of the ethylene resin is preferably not more than 44.99% by weight. If the amount of the ethylene resin is more than 44.99% by weight, the film may have a lower heat shrinkage. The amount of the ethylene resin is more preferably not more than 40% by weight. The lower limit of the amount of the ethylene resin is not limited to particular values, but preferably about 0.1% by weight.

Examples of the organic fine particles include acryl resin fine particles, styrene resin fine particles, styrene-acryl resin fine particles, urethane resin fine particles, and silicone resin fine particles. These fine particles may or may not be crosslinked, but preferably is crosslinked to have higher heat resistance. From the viewpoint of the compatibility with the cyclic olefin resin, acryl resin fine particles are preferred, with polymethyl methacrylate fine particles being more preferred.

Commercially available examples of the organic fine particles include Techpolymer (from Sekisui Plastics Co., Ltd.), FINE SPHERE (from Nippon Paint Co., Ltd.), GANZPEARL (from Aica Kogyo Company, Ltd.), and Art Pearl (from Negami Chemical Industrial Co., Ltd.).

The organic fine particles preferably have an average particle size of not less than 0.1 μm but not greater than 20 μm. If the average particle size is less than 0.1 μm, the film may not have the function of preventing blocking. Also if the average particle size is greater than 20 μm, the film may not have the function of preventing blocking. The average particle size is more preferably not less than 0.5 μm but not greater than 10 μm. The average particle size is still more preferably not less than 1 μm but not greater than 5 μm. In the present invention, organic fine particles having different average particle sizes may be used in combination. The average particle size of the organic fine particles can be determined by a known laser diffraction scattering method, for example.

The amount of the organic fine particles is not less than 0.01% by weight but not more than 0.3% by weight.

If the amount of the organic fine particles is less than 0.01% by weight, the film has a high coefficient of dynamic friction. If the amount is more than 0.3% by weight, the film has low transparency. The amount of the organic fine particles is preferably not less than 0.03% by weight but not more than 0.2% by weight.

Preferably, the heat shrinkable film of the present invention includes the front layer, the back layer, and an interlayer laminated together. Here, the interlayer contains an ethylene resin or a propylene resin in an amount of 51 to 99% by weight and a cyclic olefin resin in an amount of 1 to 49% by weight. Such a structure allows the heat shrinkable film to give excellent finishing quality.

The interlayer contains an ethylene resin or a propylene resin in an amount of 51 to 99% by weight and a cyclic olefin resin in an amount of 1 to 49% by weight.

Here, the ethylene resin and the cyclic olefin resin may be the same as those described above.

In order to exhibit heat shrinkability, the propylene resin is preferably a binary or ternary random copolymer that contains propylene as a main component and an α-olefin as a copolymerization component.

Specific examples of the α-olefin include ethylene, 1-butene, 1-hexene, and 1-octene. The propylene resin may contain two or more α-olefins. The proportion of the α-olefin as a copolymerization component is preferably 1 to 10 mol%.

The propylene resin may be a mixture of different propylene-α-olefin random copolymers.

The propylene resin preferably has a MFR of 0.1 to 30 g/10 min.

The amount of the ethylene or propylene resin in the interlayer is preferably not less than 51% by weight but not more than 99% by weight. If the amount of the ethylene or propylene resin is less than 51% by weight, excellent finishing properties may not be obtained. If the amount is more than 99% by weight, the interlayer may have reduced adhesion to the front layer and the back layer, which may lead to easy separation of the interlayer and the front and back layers. The amount of the ethylene or propylene resin is more preferably not less than 55% by weight but not more than 95% by weight.

The amount of the cyclic olefin resin in the interlayer is preferably not less than 1% by weight but not more than 49% by weight. If the amount of the cyclic olefin resin is less than 1% by weight, the interlayer may have reduced adhesion to the front layer and the back layer. If the amount is more than 49% by weight, the heat shrinkable film may have lower impact resistance. The amount of the cyclic olefin resin is more preferably not less than 5% by weight but not more than 45% by weight.

The ethylene or propylene resin in the interlayer preferably has a melting point of not higher than 150° C., and more preferably not higher than 145° C. If the melting point is higher than 150° C., the interlayer gives insufficient heat shrinkability. The melting point is preferably not lower than 100° C., and more preferably not lower than 110° C. If the melting point is lower than 100° C., the film may be soft and difficult to handle.

The interlayer may further contain a hydrocarbon resin. Examples of the hydrocarbon resin include petroleum resins, terpene resins, and rosin resins.

Examples of the petroleum resins include alicyclic petroleum resins obtained from cyclopentadiene or a dimer thereof and aromatic petroleum resins obtained from the C9 fraction.

Examples of the terpene resins include terpene resins obtained from β-pinene and terpene-phenol resins.

Examples of the rosin resins include rosin resins such as gum rosin and wood rosin and esterified rosin resins obtained by modifying rosin resins with glycerin or pentaerythritol.

Commercially available examples of the hydrocarbon resin include ARKON (from Arakawa Chemical Industries Ltd.), Clearon (from Yasuhara Chemical Co., Ltd.), and I-MARV (from Idemitsu Kosan Co., Ltd.).

The hydrocarbon resin preferably has a softening point of 100° C. to 150° C., and more preferably 110° C. to 140° C. If the hydrocarbon resin has a softening point within this range, the heat shrinkable film can exhibit good heat shrinkability.

The amount of the hydrocarbon resin in the interlayer is 0 to 40% by weight in 100% by weight of the total amount of the resins in the interlayer. If the amount of the hydrocarbon resin is more than 40% by weight, excellent finishing properties may not be obtained. The amount of the hydrocarbon resin is more preferably not more than 35% by weight.

The interlayer may further contain an olefin elastomer in an amount of 1 to 20% by weight in 100% by weight of the total amount of the resins in the interlayer.

The olefin elastomer is preferably an ethylene/α-olefin random copolymer elastomer. The term "ethylene/α-olefin random copolymer elastomer" herein means an elastomer that contains, as a copolymerization component, 15 mol % or more of an α-olefin containing 3 or more carbons. Examples of the α-olefin include propylene, butene-1, pentene-1, hexene-1, octene-1, and 4-methylpentene-1.

The amount of the olefin elastomer in the interlayer is preferably not more than 20% by weight. If the amount of the olefin elastomer is more than 20% by weight, the heat shrinkable film may have lower stiffness.

The front layer, the back layer, and the interlayer may optionally include additives such as an antioxidant, a heat stabilizer, an ultraviolet absorber, a light stabilizer, a lubricant, an antistatic agent, a flame retardant, an antibacterial agent, a fluorescent brightner, and a colorant.

In the heat shrinkable film of the present invention, the front layer, the back layer, and the interlayer may be laminated with adhesive layers interposed therebetween.

The heat shrinkable film of the present invention preferably has a total thickness of not less than 20 µm but not more than 80 µm. The total thickness of the film is more preferably not less than 25 µm but not more than 70 µm. If the total thickness of the heat shrinkable film is within the range, excellent heat shrinkability, excellent converting properties (e.g., printing properties, center-sealing properties), and excellent attachability can be obtained.

In the heat shrinkable film of the present invention, the thickness of the interlayer is preferably not less than 50% but not more than 90% of the total thickness of the heat shrinkable film. If the thickness of the interlayer is within the range, the film can have high strength between the layers and high transparency.

The heat shrinkable film of the present invention preferably has a coefficient of dynamic friction of not less than 0.3 but not greater than 0.55. The coefficient of dynamic friction is more preferably not less than 0.4 but more preferably not greater than 0.5. If the coefficient of dynamic friction is within the range, defects such as blocking can be prevented. In addition, the resultant heat shrinkable film can have improved handleability.

The heat shrinkable film of the present invention preferably has a heat shrinkage of not less than 15% but not greater than 60% when immersed in 80° C. warm water for 10 seconds. If the heat shrinkage is within the range, the heat shrinkable film can be suitably used as a heat shrinkable film without suffering poor shrinkage.

The heat shrinkable film of the present invention may be produced by any method, and is preferably produced by a method of co-extruding the layers at the same time. In the case of co-extrusion with a T-die, the layers may be laminated by a feed block method, a multi-manifold method, or combination use thereof.

The heat shrinkable multilayer film of the present invention may be produced by, for example, a method including: charging an extruder with materials for the front layer and/or the back layer, and optionally materials for the interlayer; extruding the material mixture into a sheet through a die; cooling and solidifying the sheet on a take-up roll; and uniaxially or biaxially stretching the sheet.

The way of stretching may be, for example, a roll stretching method, a tenter stretching method, or combination thereof. The stretching temperature depends on the softening temperature of resin constituting the film and required shrinkage properties of the heat shrinkable multilayer film. The stretching temperature is preferably not lower than 65° C. but not higher than 120° C. The stretching temperature is more preferably not lower than 70° C. but not higher than 115° C. The stretch ratio in the main shrinkage direction depends on resin constituting the film, the method of stretching the film, and the stretching temperature. The ratio is preferably three or more times, preferably four or more times, whereas it is preferably seven or less times, preferably six or less times. Such stretching temperature and stretch ratio enable excellent thickness accuracy.

Applications of the heat shrinkable film of the present invention are not limited. Since the heat shrinkable film of the present invention is excellent in tearing properties along the perforation, drop impact resistance, and transparency, the heat shrinkable film will be suitably used as a base film of a heat shrinkable label for containers such as plastic bottles and metal cans.

Advantageous Effects of Invention

The present invention can provide a heat shrinkable film that has excellent heat shrinkability while preventing contamination in subsequent processes such as printing.

DESCRIPTION OF EMBODIMENTS

The embodiments of the present invention are described in detail below referring to examples. The present invention is not limited to these examples.

EXAMPLE 1

An amount of 99.85% by weight of APL8008T (an ethylene-tetracyclododecen copolymer, glass transition temperature: 70° C., from Mitsui Chemicals, Inc.) as a cyclic olefin resin was mixed with 0.15% by weight of crosslinked styrene fine particles (SX, average particle size: 3.5 µm, from Soken Chemical & Engineering Co., Ltd.) as organic fine particles.

The mixture was melted in a uniaxial extruder at a barrel temperature of 210° C., extruded through a T-die, and cooled and solidified on a roll cooled to 30° C. Thus, an unstretched sheet was prepared. This unstretched sheet was stretched in TD (transverse direction) by 5 times with a tenter stretching machine at a temperature of 90° C. Thus, a film having a total thickness of 45 µm was obtained.

EXAMPLE 2

An amount of 45% by weight of APL6509T (anethylene-tetracyclododecen copolymer, glass transition temperature: 80° C., from Mitsui Chemicals, Inc.) and 14.9% by weight of APL8008T (an ethylene-tetracyclododecen copolymer, from Mitsui Chemicals, Inc.) as cyclic olefin resins, 40% by weight of linear low density polyethylene SP2320 (from Prime Polymer Co., Ltd.) as an ethylene resin, and 0.10% by weight of crosslinked polymethyl methacrylate fine particles (MBX series, average particle size: 5 μm, from Sekisui Plastics Co., Ltd.) as organic fine particles were mixed.

A film having a total thickness of 30 μm was obtained in the same manner as in Example 1 except that this mixture was used.

EXAMPLE 3

A material for the front layer and the back layer was prepared by mixing 84.85% by weight of 750R (a hydrogenated product of a norbornene ring-opening polymer, from Zeon Corp.) as an cyclic olefin resin, 15% by weight of linear low density polyethylene SP1520 (from Prime Polymer Co., Ltd.) as an ethylene resin, and 0.15% by weight of crosslinked urethane fine particles (Art Pearl C from Negami Chemical Industrial Co., Ltd., average particle size: 6 μm) as organic fine particles.

A material for the interlayer was prepared by mixing 80% by weight of linear low density polyethylene SP2520 (from Prime Polymer Co., Ltd.) and 20% by weight of 750R (a hydrogenated product of a norbornene ring-opening polymer, from Zeon Corp.) as a cyclic olefin resin.

The material for the front layer and the back layer was melted in a uniaxial extruder at a barrel temperature of 210° C., and the material for interlayer was melted in another uniaxial extruder at a barrel temperature of 180° C. The melted materials were extruded from a T-die and cooled and solidified on a roll cooled to 30° C. Thus, an unstretched sheet was prepared. This sheet was stretched in TD (transverse direction) by 5 times with a tenter stretching machine at a temperature of 90° C., whereby a film having a total thickness of 50 μm was obtained. The front layer, the interlayer, and the back layer in the film had a thickness of 9 μm, 32 μm, and 9 μm, respectively.

EXAMPLE 4

A material for the front layer and the back layer was prepared by mixing 74.9% by weight of TOPAS9506 (an ethylene-norbornene copolymer from Polyplastics Co., Ltd.) as an cyclic olefin resin, 25% by weight of linear low density polyethylene SP2020 (from Prime Polymer Co., Ltd.) as an ethylene resin, and 0.10% by weight of crosslinked polymethyl methacrylate fine particles (Art Pearl J, average particle size: 3.3 μm, from Negami Chemical Industrial Co., Ltd.) as organic fine particles.

A material for the interlayer was prepared by mixing 90% by weight of a propylene-ethylene random copolymer (ethylene content=4.0% by weight, MFR (ASTM D 1238, 230° C., 2.16 kg)=2.5 g/10 min, density (ASTM D 1505)=0.90 g/cm$^3$, DSC melting point=139° C.) and 10% by weight of TOPAS8007 (an ethylene-norbornene copolymer from Polyplastics Co., Ltd.) as a cyclic olefin resin.

The material for the front layer and the back layer was melted in a uniaxial extruder at a barrel temperature of 210° C., and the material for the interlayer was melted in another uniaxial extruder at a barrel temperature of 200° C. The procedure was otherwise the same as in Example 3, and a film having a total thickness of 50 μm was obtained. The front layer, the interlayer, and the back layer in the film had a thickness of 5 μm, 40 μm, and 5 μm, respectively.

EXAMPLE 5

A material for the front layer and the back layer was prepared by mixing 74.82% by weight of APL8008T (an ethylene-tetracyclododecen copolymer, glass transition temperature: 70° C., from Mitsui Chemicals, Inc.) as a cyclic olefin resin, 25% by weight of linear low density polyethylene SP2320 (from Prime Polymer Co., Ltd.) as an ethylene resin, and 0.18% by weight of crosslinked styrene fine particles (SX, average particle size: 3.5 μm, from Soken Chemical & Engineering Co., Ltd.) as organic fine particles.

A material for the interlayer was prepared by mixing 55% by weight of a propylene-ethylene random copolymer (ethylene content=4.0% by weight, MFR (ASTM D 1238, 230° C., 2.16 kg)=2.5 g/10 min, density (ASTM D 1505)=0.90 g/cm$^3$, DSC melting point=139° C.), 25% by weight of APL8008T (an ethylene-tetracyclododecen copolymer, from Mitsui Chemicals, Inc.) as a cyclic olefin resin, and 20% by weight of a petroleum resin (ARKON P-140, alicyclic petroleum resin from Arakawa Chemical Industries Ltd.) as a hydrocarbon resin.

A film having a total thickness of 40 μm was obtained in the same manner as in Example 3 except that the materials thus prepared were used. The front layer, the interlayer, and the back layer in the film had a thickness of 8 μm, 24 μm, and 8 μm, respectively.

COMPARATIVE EXAMPLE 1

APL8008T (ethylene-tetracyclododecen copolymer, glass transition temperature: 70° C., from Mitsui Chemicals, Inc., 99.85% by weight) as a cyclic olefin resin was mixed with 0.15% by weight of synthetic alminosilicate fine particles having an average particle size of 3.5 μm as fine particles.

A film having a total thickness of 50 μm was obtained in the same manner as in Example 1 except that this mixture was used.

COMPARATIVE EXAMPLE 2

A material for the front layer and the back layer was prepared by mixing 74.9% by weight of APL8008T (an ethylene-tetracyclododecen copolymer, glass transition temperature: 70° C., from Mitsui Chemicals, Inc.) as a cyclic olefin resin, 25% by weight of linear low density polyethylene SP2320 (from Prime Polymer Co., Ltd.) as an ethylene resin, and 0.10% by weight of synthetic silica fine particles (average particle size: 2.0 μm) as inorganic fine particles.

A film having a total thickness of 40 μm was obtained in the same manner as in Example 3 except that this mixture was used. The front layer, the interlayer, and the back layer in the film had a thickness of 8 μm, 24 μm, and 8 μm, respectively.

COMPARATIVE EXAMPLE 3

A material for the front layer and the back layer was prepared by mixing 85% by weight of APL8008T (an ethylene-tetracyclododecen copolymer, glass transition temperature: 70° C., from Mitsui Chemicals, Inc.) as a cyclic olefin resin and 15% by weight of linear low density polyethylene SP2320 (from Prime Polymer Co., Ltd.) as an ethylene resin.

A film having a total thickness of 40 μm was obtained in the same manner as in Example 3 except that the mixture was used. The front layer, the interlayer, and the back layer in the film had a thickness of 8 μm, 24 μm, and 8 μm, respectively.

COMPARATIVE EXAMPLE 4

APL8008T (ethylene-tetracyclododecen copolymer, glass transition temperature: 70° C., from Mitsui Chemicals, Inc., 99.5% by weight) as a cyclic olefin resin was mixed with 0.5% by weight of crosslinked styrene fine particles (SX, average particle size: 3.5 μm, from Soken Chemical & Engineering Co., Ltd.) as organic fine particles.

The mixture was melted in a uniaxial extruder at a barrel temperature of 210° C., extruded through a T-die, and cooled and solidified on a roll cooled to 30° C., whereby, an unstretched sheet was prepared. The unstretched sheet was stretched in TD (transverse direction) by 5 times with a tenter stretching machine at a temperature of 90° C., whereby a film having a total thickness of 45 μm was obtained.

(Evaluation)

The heat shrinkable films obtained in the examples and the comparative examples were subjected to the following evaluations. The results are shown in Table 1.

(1) Film Fouling

One surface of each obtained film was printed in two colors with indigo and white printing inks using a gravure printing machine (from FUJI KIKAI KOGYO Co., Ltd.). Specifically, a 5 mm square grid pattern was printed with the indigo ink while the white ink was printed on the entire surface. The printing rate was 120 m/min.

The film roll after the printing was rewound using a secondary slitter (from Kataoka Machine Co., Ltd.) at 150 m/min. During rewinding, the unprinted surface of the film was wiped with waste cloth on the first roll from the film roll unwinding unit upon contact of the printed surface with the roll. The waste cloth was pressed onto the unprinted surface with the index finger. The wiping was performed at film 1500 m/min.

If the part of the film onto which the waste cloth was pressed blackened after the wiping at 1500 m/min, the film was evaluated as "x (poor)." If the part hardly blackened, the film was evaluated as "o (good)."

(2) Coefficient of Dynamic Friction

The coefficient of dynamic friction of each obtained film was determined with a surface property tester (HEIDON 14FW, from Shinto Scientific Co., Ltd.). In the measurement, the front layers of two pieces of the film were brought into contact with each other. The load was 200 g, and the travel speed was 100 mm/min.

(3) Heat Shrinkage

A specimen having a size of MD (machine direction) 100 mm×TD (transverse direction) 100 mm was cut out of each obtained film. The specimen was immersed in 80° C. warm water for 10 seconds, and then taken out. The heat shrinkage in MD (machine direction) and TD (transverse direction) was calculated according to the following formula. This measurement was performed three times, and the shrinkage was the average value thereof.

Shrinkage(%)={(100−L)/100}×100

(4) Transparency

The haze value of each obtained film was determined using NDHS000 (from NIPPON DENSHOKU INDUSTRIES CO., Ltd.) in accordance with JIS K 7136.

TABLE 1

| | Film fouling | Coefficient of dynamic friction | Heat shrinkage (%) | Haze (%) |
|---|---|---|---|---|
| Example 1 | ○ | 0.48 | 55 | 4.6 |
| Example 2 | ○ | 0.43 | 27 | 6.0 |
| Example 3 | ○ | 0.47 | 40 | 5.7 |
| Example 4 | ○ | 0.42 | 34 | 5.8 |
| Example 5 | ○ | 0.47 | 38 | 5.6 |
| Comparative Example 1 | X | 0.43 | 55 | 4.4 |
| Comparative Example 2 | X | 0.45 | 38 | 5.6 |
| Comparative Example 3 | ○ | 0.74 | 38 | 3.8 |
| Comparative Example 4 | ○ | 0.74 | 38 | 8.9 |

Comparison of the examples and the comparative examples 1 and 2 shows that the films of Comparative Examples 1 and 2 blackened although they were not greatly different from the films of the examples in the coefficient of dynamic friction. This was presumably caused by shaving of the control roll due to use of inorganic fine particles instead of organic fine particles.

The film of Comparative Example 3, which was free of fine particles, had a larger coefficient of dynamic friction. This indicates that the film had lower surface smoothness. The film of Comparative Example 3, however, was not fouled. This shows that the surface smoothness of the film is not correlated with fouling of the film.

INDUSTRIAL APPLICABILITY

The present invention can provide a heat shrinkable film that has excellent heat shrinkability while preventing contamination in subsequent processes such as printing.

The invention claimed is:

1. A heat shrinkable film comprising:
a front layer; a back layer; and an interlayer, laminated together,
wherein the front layer and the back layer comprise a cyclic olefin resin in an amount from 55 to 74.9% by weight, organic fine particles in an amount from 0.03 to 0.2% by weight, and an ethylene resin in an amount from 0.1 to 25% by weight,
the organic fine particles are crosslinked-organic resin fine particles and have an average particle size in a range from 1 to 5 μm, and
the crosslinked-organic resin fine particles are at least one particles selected from the group consisting of crosslinked acryl resin fine particles and crosslinked styrene resin fine particles,
the interlayer comprises a propylene resin in an amount from 51 to 99% by weight and a cyclic olefin resin in an amount from 1 to 49% by weight, and
the propylene resin comprises a propylene-a-olefin random copolymer.

2. The heat shrinkable film according to claim 1, wherein the interlayer further comprises a hydrocarbon resin.

3. The heat shrinkable film according to claim 1, wherein the interlayer further comprises an olefin elastomer in an amount from 1 to 20% by weight.

* * * * *

UNITED STATES PATENT AND TRADEMARK OFFICE
CERTIFICATE OF CORRECTION

PATENT NO. : 10,081,166 B2
APPLICATION NO. : 14/438475
DATED : September 25, 2018
INVENTOR(S) : Maruichi et al.

Page 1 of 1

It is certified that error appears in the above-identified patent and that said Letters Patent is hereby corrected as shown below:

In the Claims

Column 10, Line 56: Delete "...a propylene-a-olefin..." and insert -- a propylene-α-olefin --.

Signed and Sealed this
Twenty-second Day of January, 2019

Andrei Iancu
*Director of the United States Patent and Trademark Office*